United States Patent
Heydlauff et al.

(10) Patent No.: US 11,976,625 B2
(45) Date of Patent: May 7, 2024

(54) ASSEMBLY, METHOD, AND TOOL FOR SECURING COMPONENTS

(71) Applicant: ADC CONNECTION SOLUTIONS GMBH, Neuhausen Auf Den Fildern (DE)

(72) Inventors: Wolfgang Heydlauff, Lichtenwald (DE); Jan Lehmann, Kirchentellinsfurt (DE)

(73) Assignee: ADC CONNECTION SOLUTIONS GMBH, Neuhausen Auf Den Fildern (DE)

( * ) Notice: Subject to any disclaimer, the term of this patent is extended or adjusted under 35 U.S.C. 154(b) by 190 days.

(21) Appl. No.: 17/598,563

(22) PCT Filed: Mar. 27, 2020

(86) PCT No.: PCT/EP2020/058698
§ 371 (c)(1),
(2) Date: Sep. 27, 2021

(87) PCT Pub. No.: WO2020/193753
PCT Pub. Date: Oct. 1, 2020

(65) Prior Publication Data
US 2022/0195982 A1  Jun. 23, 2022

(30) Foreign Application Priority Data

Mar. 28, 2019 (DE) .......................... 102019002215.7
Apr. 1, 2019 (DE) .......................... 102019002372.2

(51) Int. Cl.
*F03D 1/06* (2006.01)
*B29C 65/54* (2006.01)
*B29C 65/00* (2006.01)

(52) U.S. Cl.
CPC ............ *F03D 1/0658* (2013.01); *B29C 65/54* (2013.01); *F03D 1/0675* (2013.01);
(Continued)

(58) Field of Classification Search
CPC ... F03D 1/066; F03D 1/0675; F05B 2260/301
See application file for complete search history.

(56) References Cited

U.S. PATENT DOCUMENTS 4,420,354 A  12/1983  Gougeon et al.
4,915,590 A   4/1990  Eckland et al.
(Continued)

FOREIGN PATENT DOCUMENTS

DE  602004008070 T2  4/2008
EP         2138716 A1  12/2009
(Continued)

OTHER PUBLICATIONS

International Search Report dated Jun. 17, 2020; International Application PCT/EP2020/058698.

*Primary Examiner* — Justin D Seabe
*Assistant Examiner* — John S Hunter, Jr.
(74) *Attorney, Agent, or Firm* — DINSMORE & SHOHL LLP

(57) ABSTRACT

Components are fastened with inserts that are placed into a hole in the component and bonded with an adhesive. A decoupling element is provided on the front face of the insert. This diverts the forces around the highly stressed front face of the inserts. The insert may be of a material with a lower stiffness compared with the adhesive. This arrangement may reduce stress peaks and increase the load capacity of the connection. A tool may be provided that reduces air inclusion between the insert and the component during fitting. The connection arrangement can be used when components of different stiffnesses have to be securely (Continued)

connected to one another. This applies to, among other things, fastening of fibre composite components or mineral components to metal components.

15 Claims, 10 Drawing Sheets

(52) U.S. Cl.
CPC .......... *B29C 66/126* (2013.01); *B29C 66/721* (2013.01); *F05B 2230/60* (2013.01)

(56) References Cited

U.S. PATENT DOCUMENTS

| 2010/0209651 | A1 | 8/2010 | Mikkelsen et al. |
| 2017/0050372 | A1 | 2/2017 | Nielsen et al. |
| 2020/0263655 | A1 | 8/2020 | Bech |

FOREIGN PATENT DOCUMENTS

| EP | 2728171 | A2 | 5/2014 |
| EP | 3390811 | A1 | 10/2018 |
| WO | 2012172132 | A1 | 12/2012 |

Prior Art

ASSEMBLY, METHOD, AND TOOL FOR SECURING COMPONENTS

CROSS-REFERENCE TO RELATED APPLICATIONS

This application is a U.S. National Stage of PCT/EP2020/058698 filed Mar. 27, 2020, which claims priority to German Application No. 102019002215.7 filed Mar. 28, 2019, and German Application No. 102019002372.2 filed Apr. 1, 2019, the entire content of both are incorporated herein by reference in their entirety.

FIELD OF THE INVENTION

The present invention relates to an arrangement and a method for fastening a component. It relates to fastening elements where an insert is bonded into a prefabricated hole of a component, in particular for fastening a threaded bolt inside a rotor blade of a wind turbine.

The invention also relates to a tool and to a method for fitting the insert. The insert is placed into a prefabricated hole of a component and bonded to the component. The tool permits fitting irrespective of the position.

The invention can be applied to all fields of technology in which components are connected to one another. It can be used mainly where components of different stiffnesses have to be securely connected to one another. This applies to, among other things, connection of fibre composite components or mineral components to metal components.

In particular, the invention can be used in the field of wind turbines. A rotor blade often consists of glass-fibre-reinforced composite materials, mostly epoxy resin with embedded glass fibres (GRP). In some cases, carbon-fibre-reinforced plastic (CFRP) is also used. Since the hybrid materials can, due to the material mix, be adapted particularly well as a composite to the respective requirements, they have been used with increasing frequency in recent years. However, a secure and durable fastening of the rotor blade to a hub of the wind turbine entails particular challenges due to the specific nature of the composite material. To achieve this, a plurality of threaded bolts, as a rule evenly spaced, is arranged in a circular shape on the rotor blade root as an insert, which is fastened, in particular bonded, inside recesses of the rotor blade extending substantially in the longitudinal axis of the rotor blade and is used to connect the rotor blade to a rotor hub of a wind energy turbine.

BACKGROUND OF THE INVENTION

Inserts that are placed into components are available for rotor blades of wind turbines, among other things. They are described in detail in the U.S. Pat. Nos. 4,420,354 or 4,915,590. A threaded bolt and an insert transmit the forces between two components, for example between a rotor blade root of a rotor blade of a wind turbine and a hub of the wind turbine.

The insert can be fitted as indicated in patent WO 002012172132 by means of vacuum infusion. According to the prior art, an inlet for the adhesive at one point of the insert and an outlet for the air present in the adhesive gap at another point of the insert are used to do so.

One weakness of fitting as described above is that air inclusions can remain in the gap between insert and hole. These air inclusions lead to a reduction in the strength of the connection.

Also, a precise position of the component has to be ensured during fitting at present in order to reduce air inclusions.

Furthermore, a disadvantageous weakness in the prior art for this type of connection is the area on the front face of the insert. In this area, stress peaks form due to the differences in stiffness between insert, adhesive and component. Under extreme loads or variable loads, these stress peaks lead first to cracks and later to failure of the component. The solution to this has until now been, as shown for example in patent DE 602004008070, to design the end of the insert very pointed. However, this in turn disadvantageously leads to a greater component length and correspondingly higher weight and higher costs.

SUMMARY OF THE INVENTION

The object of the present invention is therefore to propose a fastening arrangement, a fastening method and tool usable therefor that overcome the aforementioned disadvantages.

This object is achieved by a fastening arrangement, a fastening method and a fastening tool as disclosed herein. Advantageous embodiments of the invention are also disclosed.

In accordance with the invention, an arrangement is proposed for fastening a component by means of an insert, said component having in an end face on the fastening side at least one hole designed to receive the insert, which is placed into the hole with a front face first, an intermediate space between the insert 21 and the inner wall of the hole being at least partially filled with an adhesive 31.

It is proposed that at least one decoupling element is inserted between the insert and the inner wall for reduction of stress peaks, the stiffness of which element is less than a stiffness of the cured adhesive.

Alternatively or additionally, it is proposed to include a tool in the arrangement and to insert it during fitting such that air inclusion between insert and component is reduced.

Both the tool and the decoupling element permit an improved quality of the fastening with synergetic interaction, but also already offering as an individual measure a significant increase in the quality of the fastening. To that extent, both objects can be inserted in combination and also singly.

The invention thus relates in one aspect to connections which are made by means of insert and bolt and are designed for example in the following manner:

A component is fastened to a holder. The fastening consists of a bolt, a nut and an insert. The insert is located in a hole of a component and is bonded to the component. The insert is screwed to the bolt. The bolt is located in a through-hole of the holder. A nut on the bolt tightens the entire connection.

The invention relates to the bonding of the insert to the component. A decoupling element is located in the area of the front face of the insert. The decoupling element reduces the forces acting on the front face of the insert. As a result, the forces are introduced into the insert at a point subjected to lower stress.

Thanks to the decoupling element, the stresses in the connection arrangement fall. This increases its strength and resistance to alternating stress.

In an advantageous embodiment, the hole in the component can have a longitudinal axis, said longitudinal axis passing through the geometrical centre of the hole, and parts of the decoupling element have a distance to the longitudinal axis which is greater than the arithmetical mean outer radius of the front third of the insert.

Differing design variants of the decoupling element ensure the properties described above. The decoupling element can for example consist of a relatively soft material. This can be, among other materials, rubber or foam. The soft material can absorb comparatively low forces and hence not pass them on to the insert.

In an advantageous embodiment, the stiffness of the decoupling element can be at least 20% less than the average stiffness of the cured adhesive, and/or the hole in the component can have cross-sectional surfaces aligned vertical to the longitudinal axis of the hole and the surface of the decoupling element can be larger than 10% of the average cross-sectional surface of the hole.

In an advantageous embodiment, the lower stiffness of the decoupling element can be attained by a material with a modulus of elasticity at least 20% lower than the cured adhesive, and/or the lower stiffness of the decoupling element can be attained by an omission in the adhesive, and/or the lower stiffness of the decoupling element can be attained by a separating layer with reduced adhesion between two areas of the construction, and/or the lower stiffness of the decoupling element can be attained by the provocation of cracks between two areas of the construction.

In an advantageous embodiment, the decoupling element can consist of at least one material, and/or the decoupling element is one-part or multi-part, and/or the decoupling element is a hollow element, and/or the decoupling element is a hollow space. To that extent, the decoupling element can also be a hollow space or hollow body. This too prevents force transmission between the front face of the insert and the component.

In an advantageous embodiment, the insert can have at least one side face having a distance to the component, the fastening area of the insert being that part which is located in the component, and the arithmetical mean distance between the side face and the component in the front tenth of the fastening area of the insert can be greater than 10% of the arithmetical mean radius of the fastening area of the insert.

Decoupling elements which initiate the cracks at certain points or represent a separation level between two areas of the connection have a similar function. The decoupling element could for example be a separating means which is emplaced locally in the adhesive. Under load, no tensile force can be transmitted via this separating layer either.

In an advantageous embodiment, the component can be a rotor blade for wind energy turbines.

In a subordinate aspect, a method is proposed for fastening a component by means of an insert, with the following work steps:
provision of a component with hole;
provision of an insert;
provision of a decoupling element;
insertion of the decoupling element into the hole of the component;
insertion of the insert into the component;
emplacing of an adhesive;
curing of the adhesive.

In an advantageous embodiment of the fastening method, a decoupling element described above can be used.

In an advantageous embodiment of the fastening method, the component can be a rotor blade for wind energy turbines.

In a further subordinate aspect, a tool for fitting of a fastening element is proposed. The tool is inserted into connections which are bolted by means of insert and bolt and are designed for example in the following manner:

A component is fastened to a holder. The fastening consists of a bolt, a nut and an insert. The insert is located in a hole of a component and is bonded to the component. The insert is screwed to the bolt. The bolt is located in a through-hole of the holder. A nut on the bolt tightens the entire connection.

The invention relates in a further aspect to a tool for making such a connection arrangement. The tool is placed with the insert into the hole of the component. This results in an intermediate space between insert, tool and component which is filled with a medium, for example air.

Both the decoupling element discussed above and the tool for reducing air inclusion increase the quality of the fastening, in particular for fastening two join partners of which at least one is made from a composite material, such as a rotor blade of a wind turbine. Both the decoupling element and the tool can be used here singly or in combination, to significantly increase by synergy the load capacity and the durability of the fastening.

The tool is thus used to fit the insert to the component, and enables air between the insert and the component hole to be removed. To do so, the insert is located in a hole in the component. The area between insert and component is filled with an adhesive.

The air therein must be displaced during placing of the adhesive. This may result in air inclusions. To prevent these air inclusions at least partially, the position of the component has until now been exactly aligned, or air inclusions have been tolerated at the expense of the strength of the connection.

The proposed tool is intended to prevent air inclusions and permit fitting irrespective of the position. It is proposed that the tool has several air outlets arranged spread out over the hole depth. Air inclusions can no longer occur as a result. Fitting irrespective of the position is enabled with the aid of flow regulation elements that prevent the flow of the adhesive into the outlet ducts.

The tool can be used during bonding of inserts for which fitting irrespective of the position, a higher process reliability or reduced fitting times are required.

The tool therefore has at least two outlets through which the medium can escape during bonding of the insert. As a result, air inclusions are avoided in every installation position. This reduces rejects and avoids the need for reworking. At least one outlet here is in the area of that half of the hole on the end face side and at least one outlet is in the area of that half of the hole on the component side.

Different design variants of the tool ensure the properties described above. The tool can be one-part or multi-part. The blocking of the outlets by the adhesive can be prevented for example by membranes, discharge siphons, restrictors or overflow containers.

In addition, the tool can be used for alignment or centring of the insert.

An advantageous embodiment can thus contain a flow regulation element, the latter containing at least one membrane, and/or at least one discharge siphon, and/or at least one restrictor and/or at least one overflow container and/or at least one air outflow valve.

In an advantageous embodiment, the tool can centre the insert in the hole, and/or the tool can align the insert in the hole, and/or the tool can align the insert to the component, and/or the tool can align the insert to other inserts.

In an advantageous embodiment, the tool can contain a heating element.

In an advantageous embodiment, the tool can consist of at least one material, and/or the tool can be designed one-part or multi-part.

In an advantageous embodiment, the tool can be designed specifically for a component as a rotor blade for wind energy turbines.

In a further subordinate aspect, a method is proposed for fastening a component by means of an insert and a previously described tool, with the following work steps:
provision of a component with hole;
provision of an insert;
provision of the tool;
insertion of the insert 21 into the component;
insertion of at least one part of the tool into the hole of the component;
emplacing of an adhesive;
curing of the adhesive.

In an advantageous development of the method, an intermediate space can be present between the insert and the inner wall of the hole which is filled with a medium, in particular an adhesive, which must be displaced for bonding, and the medium to be displaced escapes through at least one outlet in the area of that half of the hole on the end face side and through at least one outlet in the area of that half of the hole on the component side by means of the tool.

In an advantageous development of the fastening method with the aid of the tool, the component can be a rotor blade for wind energy turbines.

DETAILED DESCRIPTION OF THE DRAWINGS

Further advantages emerge from the following drawing description. The drawing shows examples of the invention. The drawing, the description and the claims contain many features in combination. The person skilled in the art will also consider the features individually, and combine them into useful further combinations.

In the drawing,

FIG. 1 shows a design variant of the connection arrangement 10. The arrangement 10 connects a component 11 to a holder 18;

FIG. 2 represents the current prior art. An insert 21 is located in a hole, FIG. 3/13, of a component 11. An adhesive 31 connects the insert 21 to the component 11. Cracks 100 arise in the area of the front face, FIG. 1/23, of the insert 21 due to the high load;

FIG. 3 shows the component 11 with an end face 12 in which a hole 13 is located. The hole 13 has a longitudinal axis 15;

FIG. 4 is a sectional view of the component 11 vertical to the longitudinal direction, FIG. 3/15, of the hole 13. A hole 13 is provided in the component 11. This hole has a cross-sectional surface 14;

FIG. 5 represents a design variant of the connection arrangement 10, the decoupling element being a separating layer 51 which is emplaced in the adhesive 31;

FIG. 6 represents a design variant of the connection arrangement 10, the decoupling element being cracks 61 provoked in the component 11;

Figure 10:
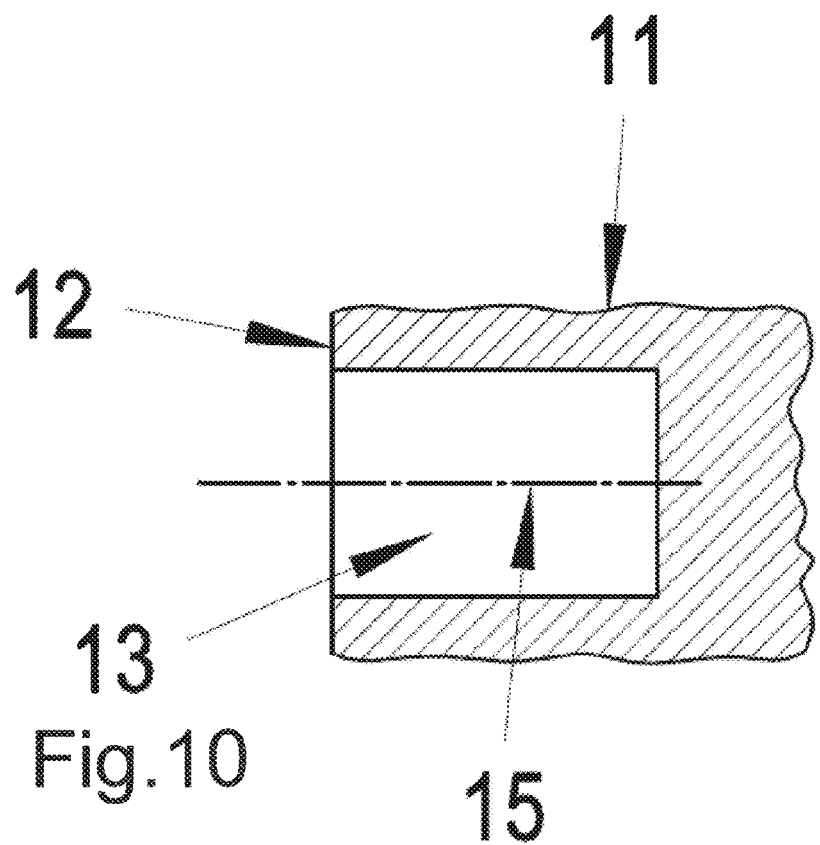
Figure 11:
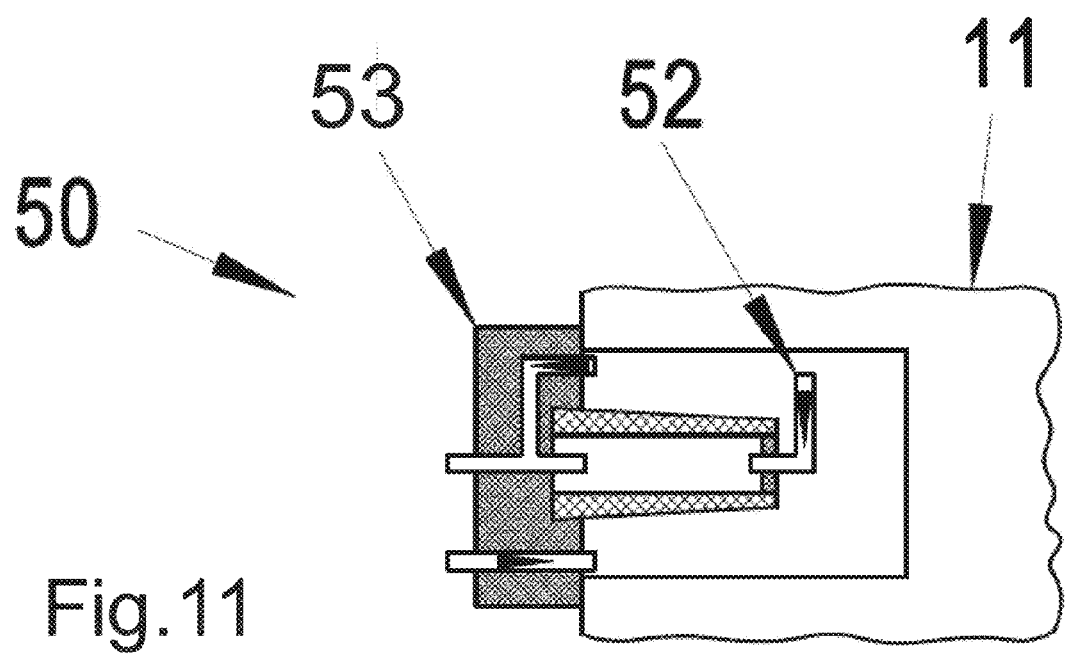
Figure 12:
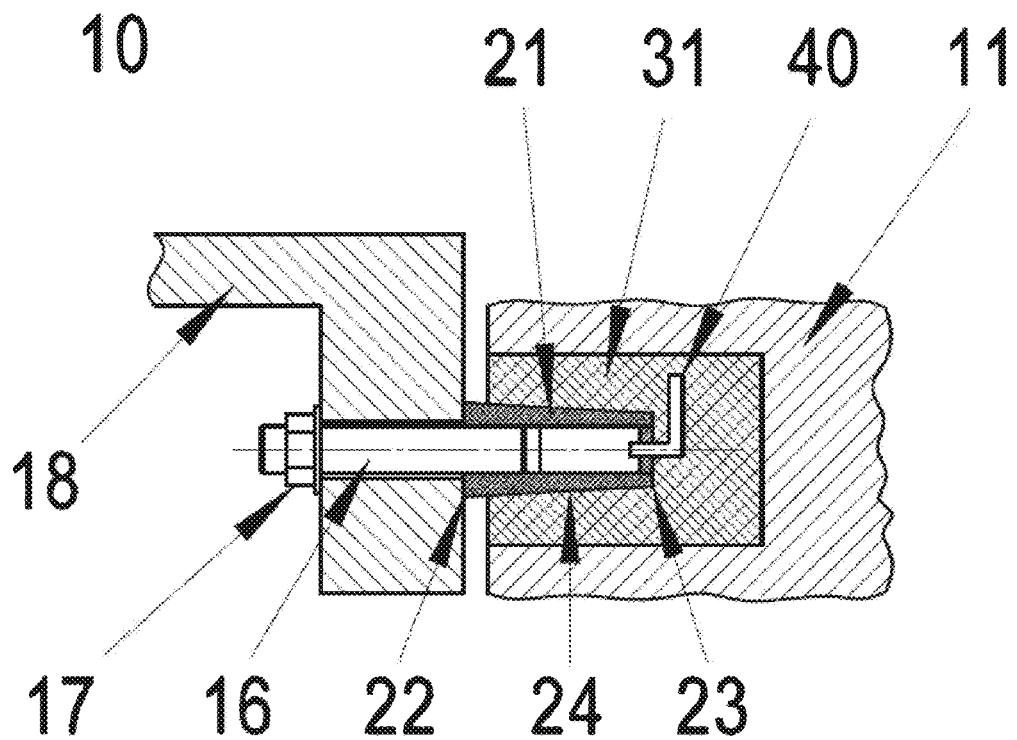
Figure 13:
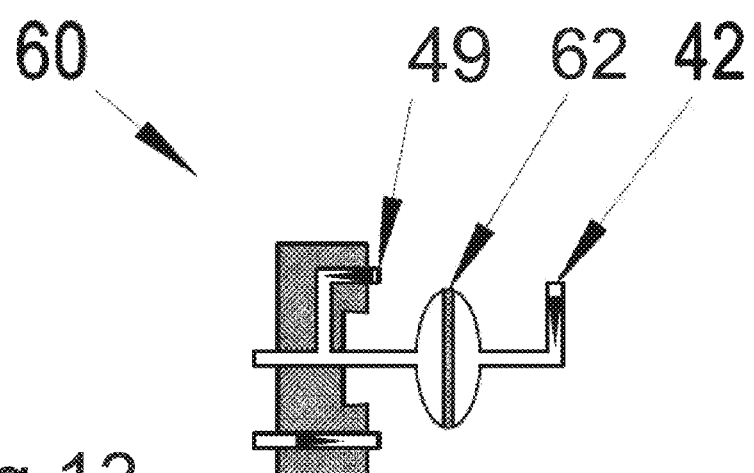
Figure 14:
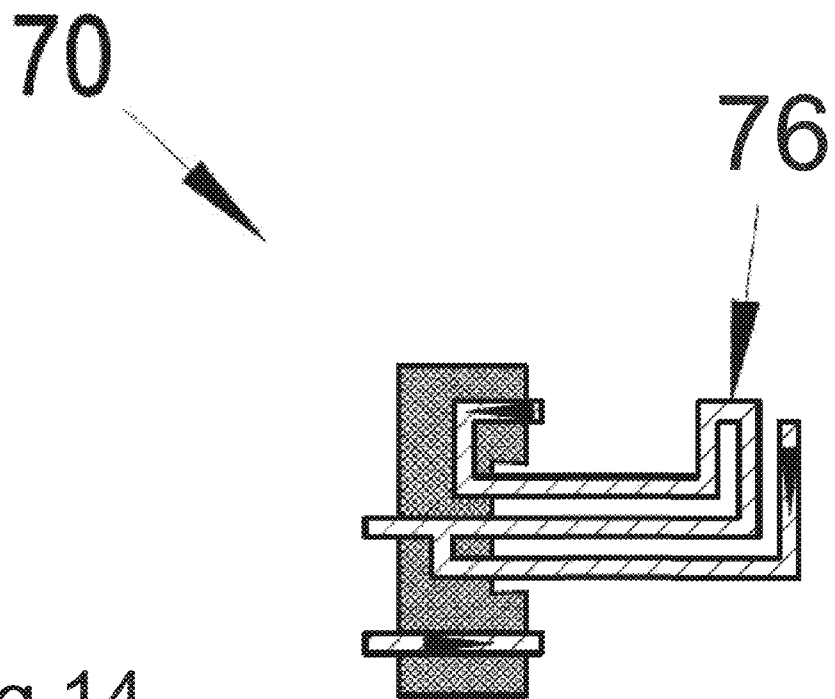
Figure 15:
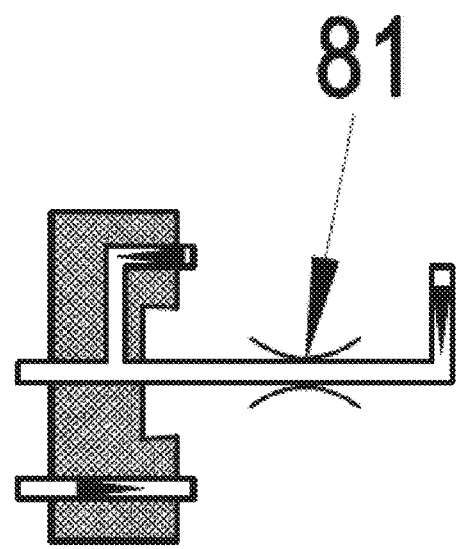
Figure 16:
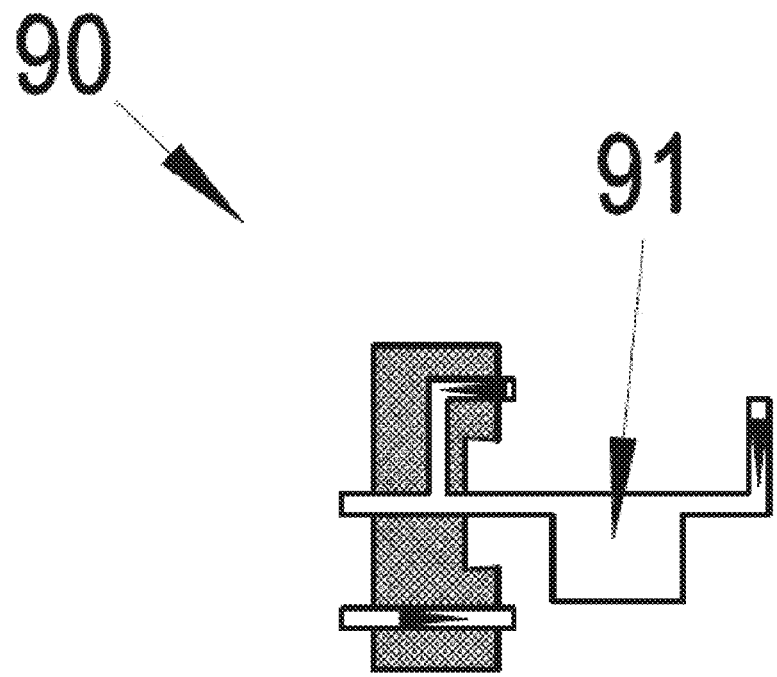
Figure 17:
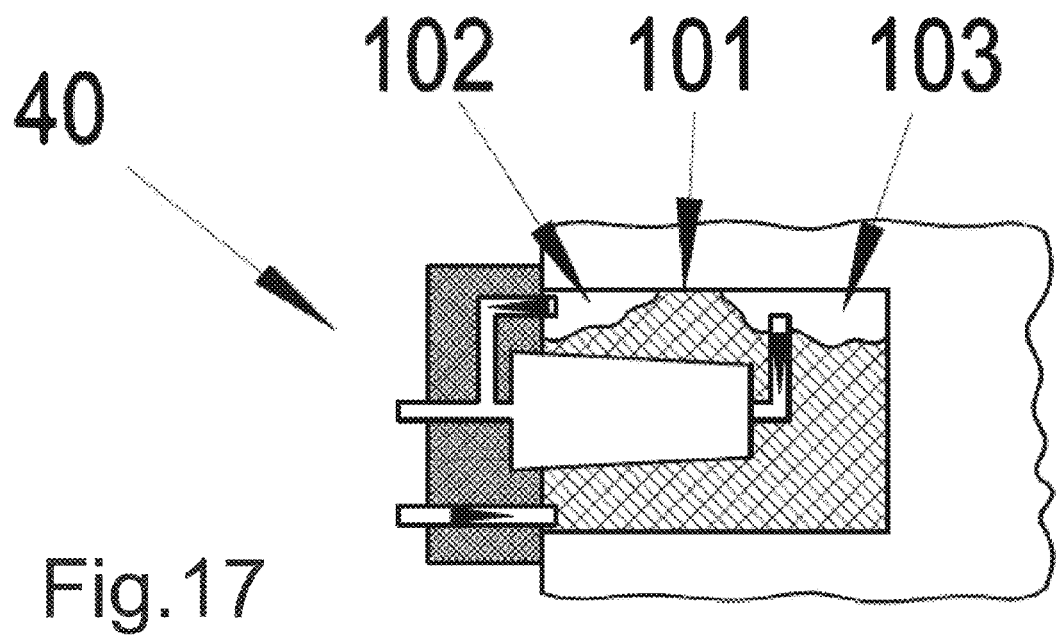
Figure 18:
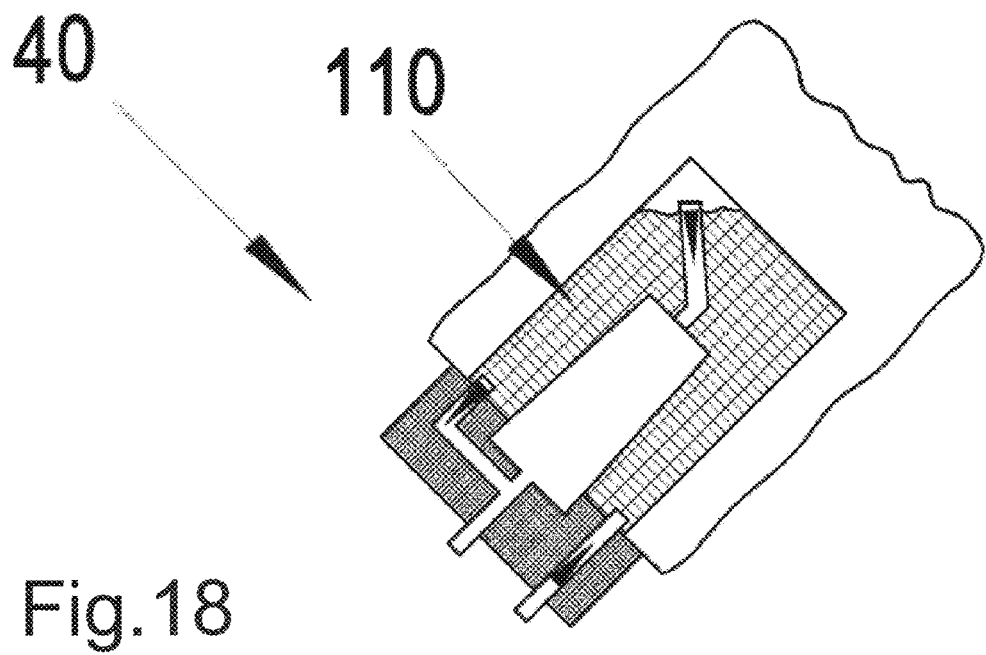
Figure 19:
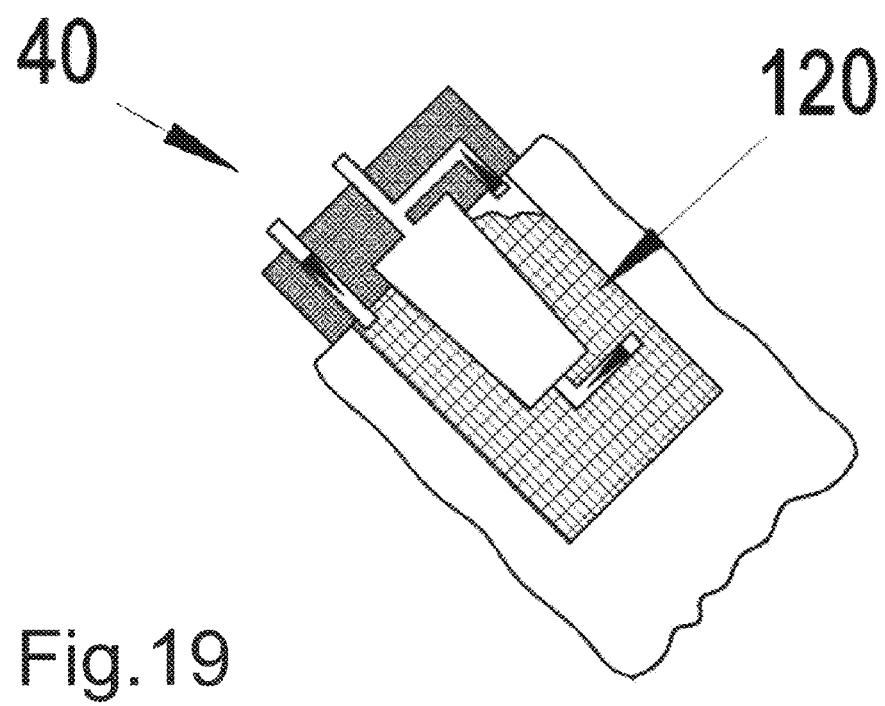

FIG. 10 represents a section through the component 11 with a hole 13. The component has an end face 12. The hole has a longitudinal axis 15;

FIG. 11 represents a further embodiment of the tool 40;

FIG. 12 shows an embodiment of the connection arrangement 10. The arrangement 10 connects a component 11 to a holder 18;

FIG. 13 represents an embodiment 60 of the tool 40;

FIG. 14 represents a further embodiment 70 of the tool 40;

FIG. 15 represents a further embodiment 80 of the tool 40;

FIG. 16 represents a further embodiment 90 of the tool 40;

FIG. 17 represents the process of bonding as an embodiment of the fastening method in accordance with the invention;

FIG. 18 represents the process of bonding as a further embodiment of the fastening method in accordance with the invention, with an inclined setting of the connection arrangement 10 of +45°;

FIG. 19 represents the process of bonding as a further embodiment of the fastening method in accordance with the invention, with a setting of the connection arrangement 10 inclined by −45°.

DETAILED DESCRIPTION OF THE INVENTION

In the figures, identical or similar components have the same reference numerals. The figures show only examples and must not be understood as restrictive.

Figure 1:
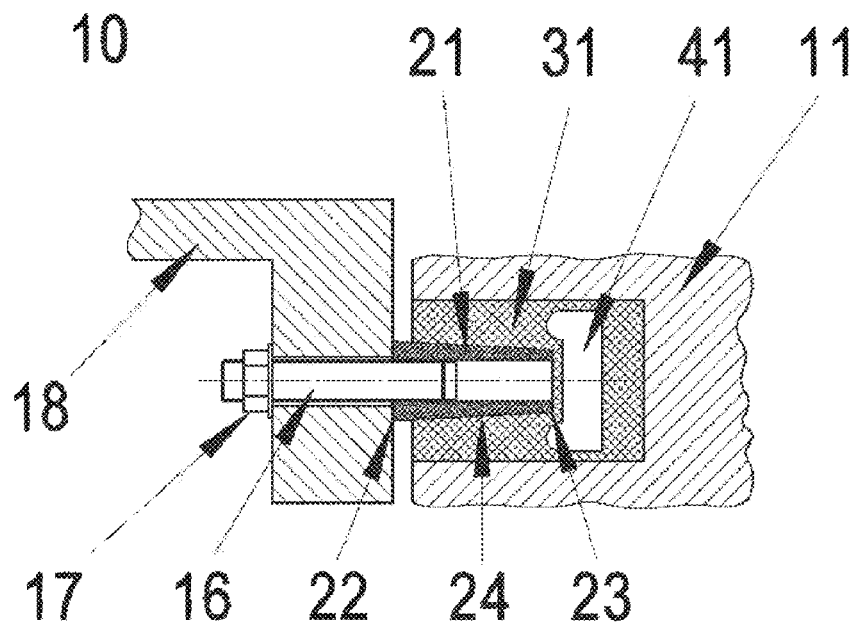

FIG. 1 represents a design variant of the fastening arrangement in accordance with the invention. An insert 21 with a side face 24 is located with its front face 23 first in a hole of a component 11. A decoupling element 41 is located on the front face 23 of the insert 21. The area between the component 11, the insert 21 and the decoupling element 41 is at least partially filled with cured adhesive 31. A holder 18 rests on the rear face 22 of the insert 21. A through-hole for a threaded bolt 16 is located in the holder 18. The threaded bolt 16 is bolted to the insert 21. A pre-stressing force is applied to the connection 10 via a nut 17.

Figure 3:
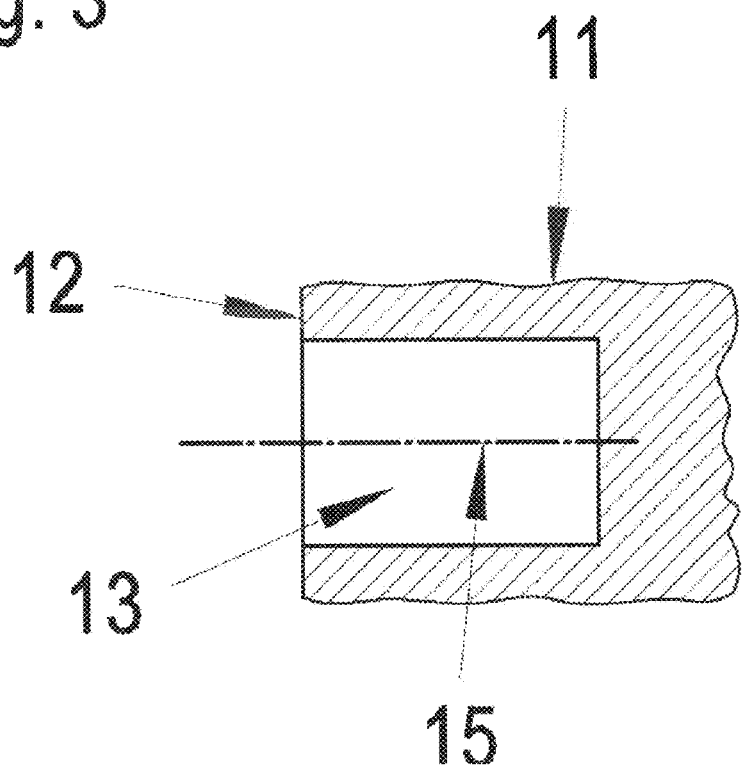

A decoupling element 41 and an insert 21 with at least one side face 24 is located in a hole, FIG. 3/13, of the component 11. The insert 21 is located with its front face 23 first in the component 11. The decoupling element 41 is located in the area of the front face 23 of the insert 21. Adhesive 31 connects insert 21, component 11 and decoupling element 41. The insert 21 is connected to the bolt 16 by a bolted connection. The bolt 16 is located in a through-hole in the holder 18. The holder 18 rests on the rear face 22 of the insert 21. A pre-stressing force is applied to the connection 10 via a nut 17.

In this design variant, the decoupling element 41 consists of a material having a stiffness considerably lower than that of the cured adhesive 31. Due to the lower stiffness of the decoupling element 41, it can transmit hardly any forces between the component 11 and the front face 23 of the insert 21. The decoupling element 41 shields the front face 23 of the insert 21. The high stresses on the front face 23 of the insert 21 fall. The deflected forces are introduced into the insert 21 at other points due to the decoupling element 41. In this way, the forces are distributed more evenly over the side face 24 of the insert 21.

Several design variants of the insert 21 are possible. For example, the insert 21 can, as shown in FIG. 1, have an internal thread. The internal thread is used to receive a bolt 16.

Another design variant is an insert 21 with an external thread. A nut 17 can be screwed directly onto this insert 21. A bolt 16 is not needed.

A further design variant of an insert 21 is a rod without a thread. The rod is for example bonded to the holder 18 or connected by a cross-bolt or a split pin to the holder 18.

In FIG. 1, the decoupling element 41 protrudes beyond the front face 23 of the insert 21 and partially encloses the side face 24 of the insert 21. The decoupling element 41 also fills a large part of the hole cross-section 14. Both properties lead, independently of one another, to a better decoupling of the insert 21 from the component 11.

The decoupling element 41 can also be a hollow space or hollow body. The hollow body contains inclusively, but not exclusively, a gas, for example air, a liquid or a vacuum. The hollow body leads to the decoupling element 41 no longer having any stiffness. This arrangement 10 too reduces the forces that can be transmitted in the direction of the longitudinal axis 15 by the shortest route from the component 11 to the insert 21. These forces are deflected around the decoupling element 41 and introduced into the insert 21 at another point. As a result, the stress peaks on the front face 23 of the insert 21 are reduced and the strength of the connection 10 is increased.

The decoupling element 41 can be one-part or multi-part. Furthermore, the decoupling element 41 can consist of one or more materials.

The insert 21 shown in FIG. 1 and the hole 13 in the component 11 can be shaped in very different ways. Their cross-sections can for example be round or angular. Their cross-sections can change as required in the longitudinal direction. For example, the insert 21 can have a blunt, rounded or pointed end in the direction of the front face 23. By way of description, this patent makes reference to the diameter of the insert 21 or to the diameter of the hole, FIG. 3/13, in the component 11. If the insert or the hole, FIG. 3/12, in the component is not round, the diameter of the non-round cross-section, FIG. 4/14, corresponds to the diameter of a reference circle, FIG. 4/81, whose area corresponds to the area of the non-round cross-section, FIG. 4/14. The centres of the area, FIG. 4/82, of the reference circle and of the non-round cross-section, FIG. 4/14, are identical. With non-round cross-sections, the insert 21 can also have several side faces 24.

Figure 2:
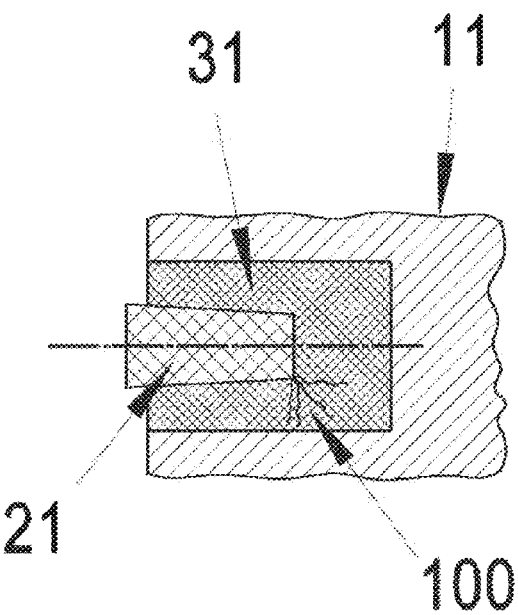

FIG. 2 represents a connection arrangement 10 according to the previous prior art. It consists of a component 11 and an insert 21. The insert 21 is located in a hole, FIG. 3/13, of the component 11. Component 11 and insert 21 are connected using an adhesive 31.

Due to the excess stresses on the front face, FIG. 1/23, of the insert 21, cracks 100 ensue which can lead to failure of the connection 10.

FIG. 3 represents a section through the component 11 with a hole 13. The component has an end face 12. The hole has a longitudinal axis 15. The hole 13 can be made in the component 11 at any required angle. In FIG. 3, the hole 13 is made vertical to the end face 12.

Figure 4:
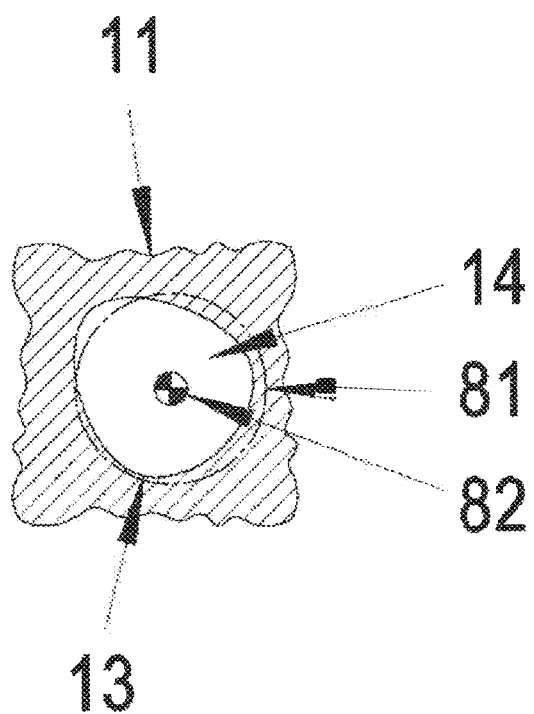

FIG. 4 is a sectional view of the component 11 from FIG. 3. In this view, the hole, FIG. 3/13, with its cross-section 14 can be discerned. The cross-section 14 can have any shape. A reference circle 81 has the same area as the cross-section 14 of the hole 13. The centres 82 of the areas of the cross-section 14 and of the reference circle 81 are identical.

Figure 5:
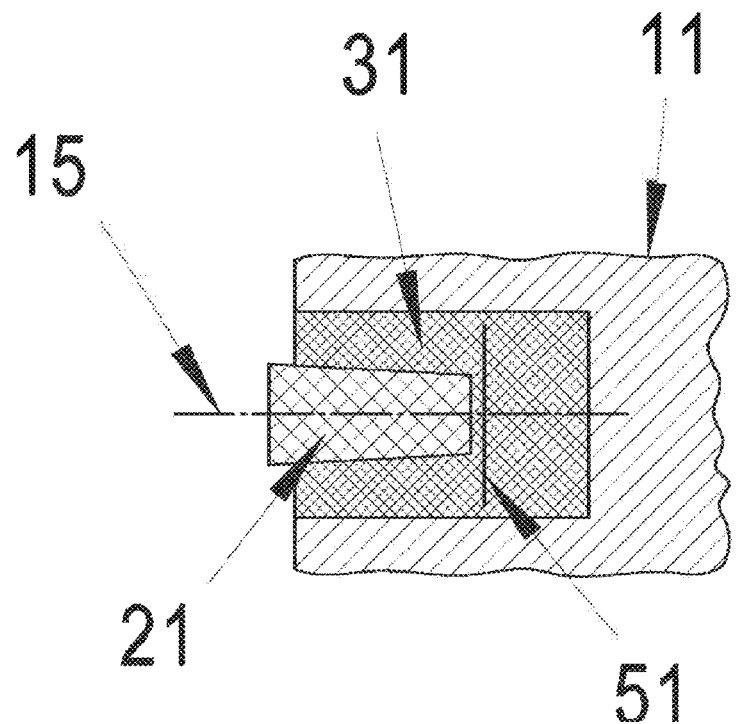

FIG. 5 represents a further design variant of the invention. The insert 21 is located in the hole, FIG. 3/13, of the component 11. Component 11 and insert 21 are at least partially connected using adhesive 31. The decoupling element, FIG. 1/41, is a separating layer 51. This separating layer 51 reduces or prevents force transmission in the direction of the longitudinal axis 15 of the connection 10.

The separating layer 51 can be inclusively, but not exclusively, a film or a separating means. The forces are deflected around the separating layer 51 and introduced into the insert 21 at another point.

As a result, the stress peaks on the front face 23 of the insert 21 are reduced and the strength of the connection 10 is increased.

Figure 6:
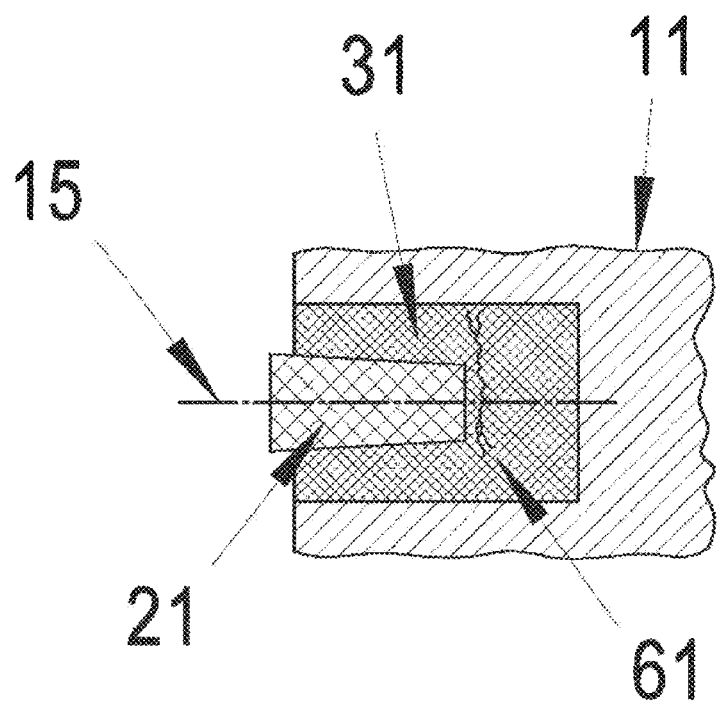

FIG. 6 represents a further design variant of the invention. The insert 21 is located in the hole, FIG. 3/13, of the component 11. Component 11 and insert 21 are at least partially connected using adhesive 31. The decoupling element, FIG. 1/41, is provoked cracks 61 in the adhesive 31, the component 11 or the insert 21. These cracks 61 reduce or prevent force transmission also in the direction of the longitudinal axis 15 of the hole, FIG. 3/13. The cracks 61 can be caused inclusively, but not exclusively, by scoring in the adhesive 31, scoring on the inside of the hole, FIG. 3/13, or scoring on the insert 21.

Figure 7:
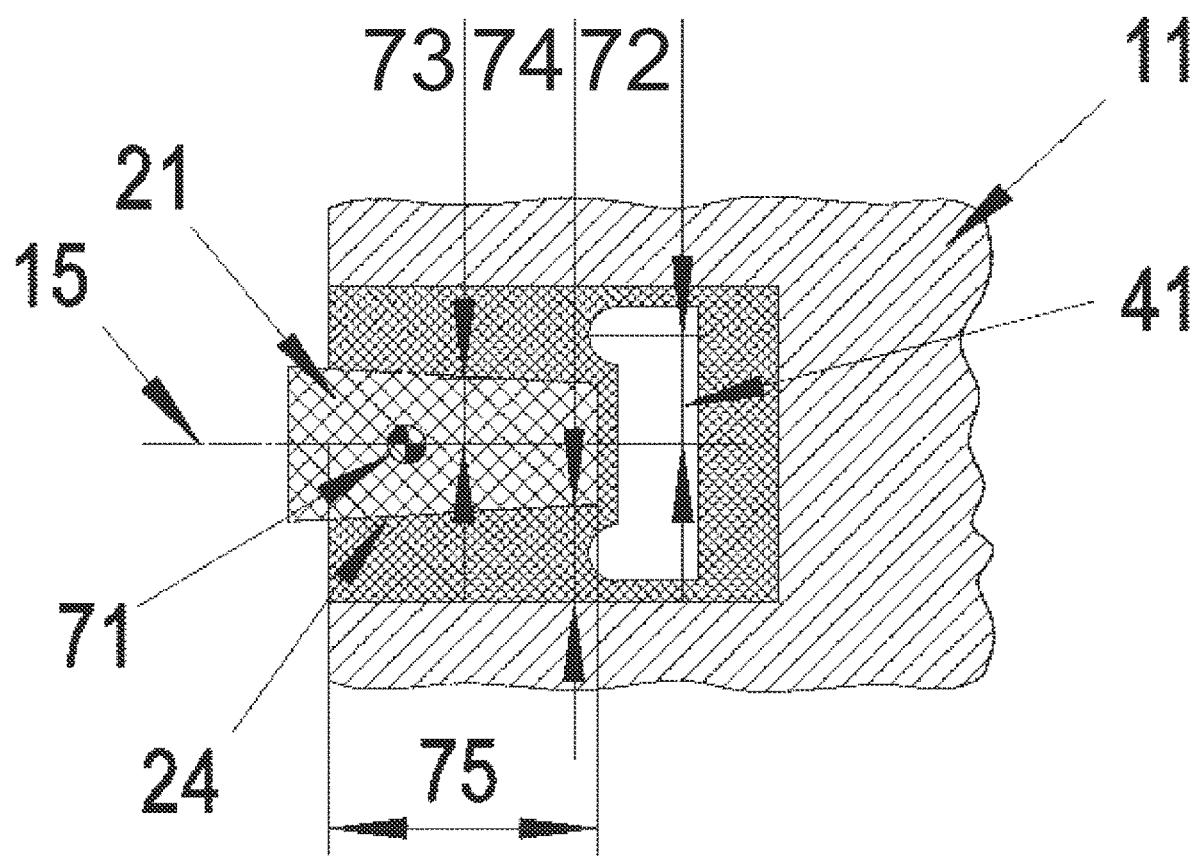
FIG. 7 represents an embodiment of the connection arrangement in detail.

FIG. 7 shows the connection arrangement 10 in detail. The hole 13 in the component 11 has a geometrical centre of gravity 71. One part of the decoupling element 41 is at a distance 72 to the longitudinal axis 15 of the hole 13. The insert 21 has an outer radius 73. The component 11 is at a distance 74 to the side face 24 of the insert 21.

The connection arrangement 10 is made for example by drilling a hole 13 into a component 11. A decoupling element 41 is then inserted into the component. In a further step, an insert 21 is placed with its front face 23 first into the hole. The resultant intermediate space between component 11, insert 21 and decoupling element 41 is filled with adhesive 31. The intermediate space can be filled for example by vacuum infusion or injection. It would also be possible to emplace the adhesive 31 first in the hole 13 of the component 11 and then to press the decoupling element 41 and the insert 21 into the still-liquid adhesive 31. In a further step, the adhesive 31 cures and is if required tempered. Finally, the insert 21 can be fastened with the aid of a bolt 16 and a nut 17 to a holder 18.

A variant of the manufacture described above of the connection arrangement 10 is to emplace the adhesive 31 in two layers. The hole 13 in the component 11 is filled up to just in front of the front face 23 of the insert 21 with a first layer of adhesive 31. Then the first layer of the adhesive 31 cures. In a second step, the insert 21 is placed into the hole 13 of the component 11. The remaining intermediate space between insert 21 and component 11 is then filled with a second layer of adhesive 31. Then the second layer of the adhesive 31 cures. The adhesion is greatly reduced in the transition area between the first and second layers of adhesive 31. The transition area with reduced adhesion is in this case the decoupling element 41. Under a low load, cracks 61 ensue in the contact surface between the adhesive layers. Forces cannot be transmitted or only to a reduced extent in the transition area, and the excessive stresses in the area of the front face 23 of the insert 21 are reduced.

A variant of the manufacture described above of the connection arrangement 10 is to apply a separating means to the bottom of the drilled hole or onto a first layer of adhesive. The surface 51 wetted with separating means cannot transmit forces and shields the front face 23 of the insert 21 against forces.

The aim of the furthermore proposed fitting tool 40, 50, 60, 70, 80, 90 is to design the connection arrangement 10 simpler and more reliable. The connection arrangement 10 referred to contains an insert 21 that is bonded to a component 11. A tool 40 is to be used for fitting the inserts 21. The tool 40 is intended to reliably remove the air between the insert 21 and the component 11. Furthermore, the tool 40 is intended to align the insert 21 in the hole 13 of the component 11.

For reliable removal of the air, the tool 40 should have at least two air outlets. Of these, at least one outlet 49 should be located in the area of the hole 13 on the end face side. At least one second outlet 42 should be located in the area of the hole 13 on the component side. As long as at least one of the outlets 49, 42 is not blocked with adhesive 31 during emplacing of the adhesive 31, air can still be removed from the intermediate space 31 between the insert 21 and the component 11. This leads to fewer air inclusions and hence to a higher process reliability during fitting of the insert 21.

Figure 8:
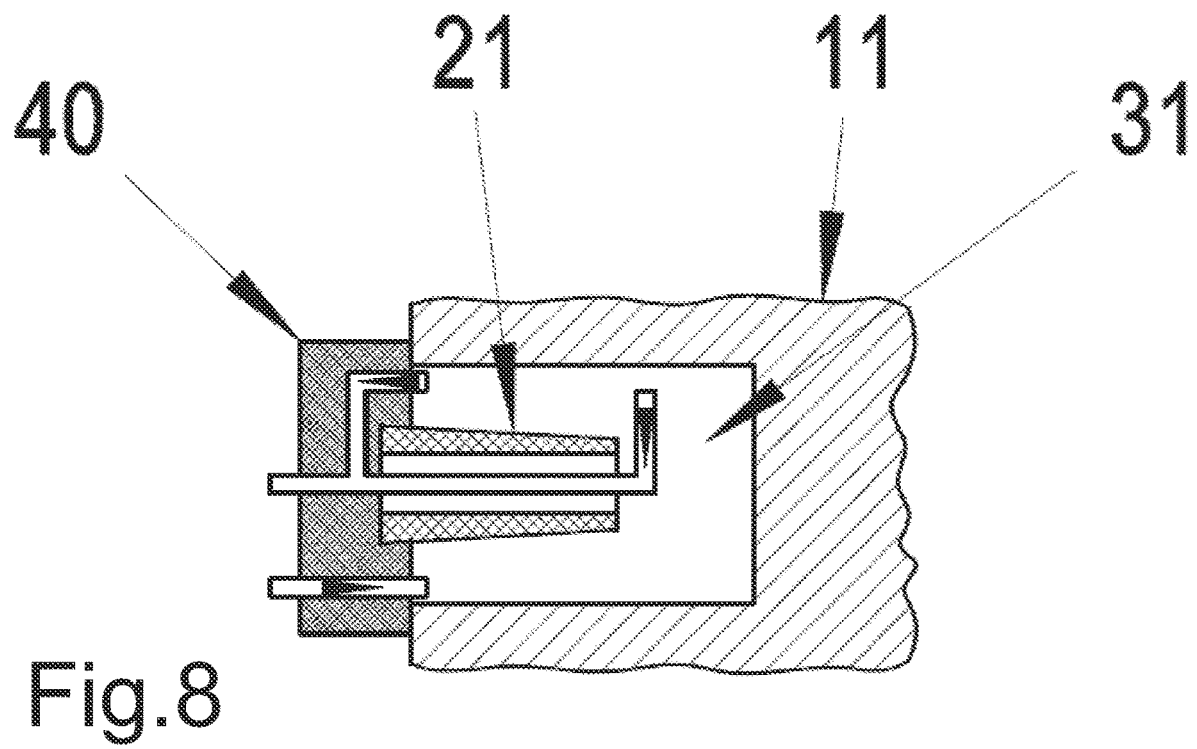
FIG. 8 represents a design variant of an embodiment 40 of the tool in accordance with the invention.

FIG. 8 represents an embodiment of the tool 40. Insert 21 and tool 40 are located partially in the hole 13 of the component 11. An intermediate space 31, which is filled with a medium such as air, is thus created between tool 40, component 11 and insert 21. Before bonding the component 11 to the insert 21, the medium must be displaced from the intermediate space 31. An intermediate space 31 between component 11, insert 21 and tool 40 is filled with air. For bonding the insert 21 to the component 11, the intermediate space 31 is to be filled with adhesive. To do so, the air in the intermediate space 31 must escape. The tool 40 has air outlets 49, 42 for that purpose. After bonding the component 11 and the insert 21, the tool 40 is removed so that only the insert 21 remains in the component 11.

Figure 9:
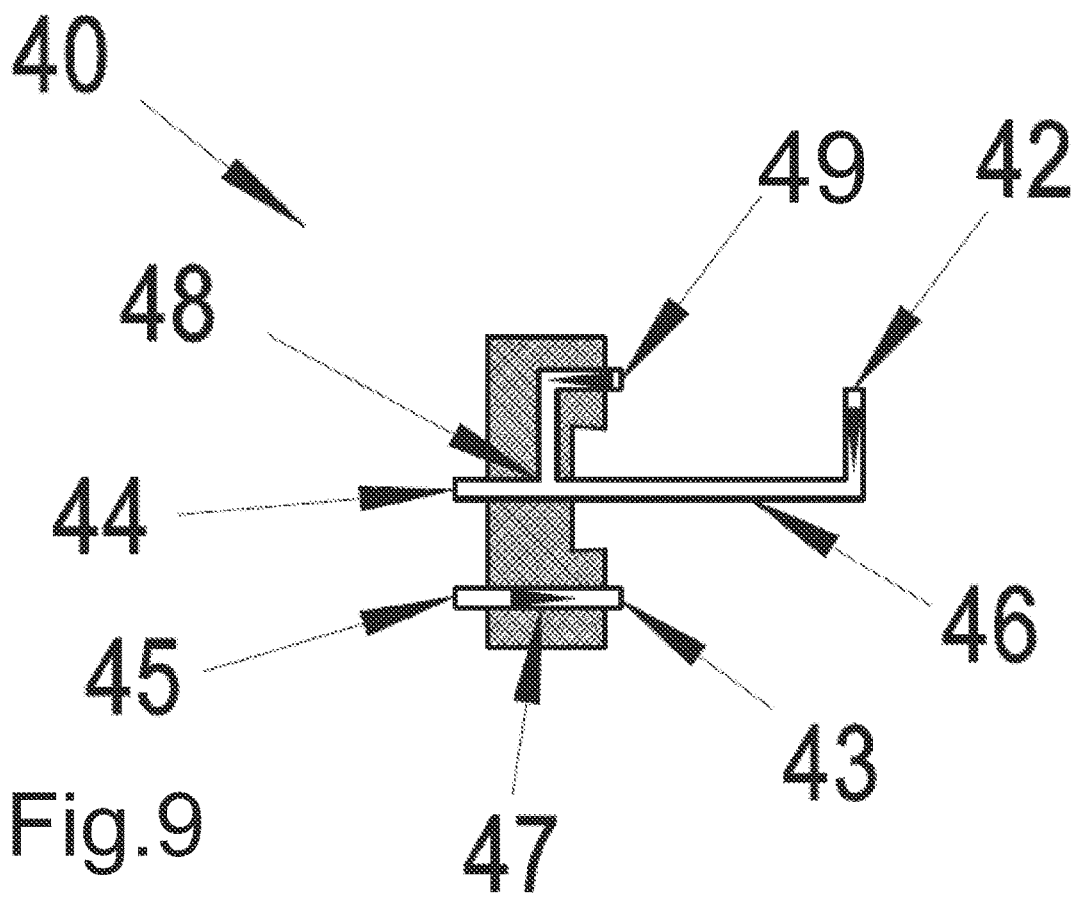
FIG. 9 represents a further design variant 50 of the tool.

FIG. 9 shows details of the design variant of the tool 40 from FIG. 8. The tool 40 has a first outlet 49 and a second outlet 42 for the medium to be displaced. The medium is passed through a duct 46 and discharged at an outflow port 44. The adhesive is supplied to the tool 40 at the inlet port 45. The adhesive in the tool is passed on via a duct 47 and emplaced in the area 31 between component 11 and insert 21 at the inlet 43. The tool 40 has two outlets 49, 42. One of the outlets 49 is located in the area of the hole 13 on the end face side. The second outlet 42 is located in the area of the hole 13 on the component side. The outlets 49, 42 are connected via an outflow pipe 46 to the outflow port 44. The outlets 49, 42, the outflow pipe 46 and the outflow port 44 are used to remove the air from the intermediate space 31 between insert 21, component 11 and tool 40. The tool 40 also has an inlet port 45 which is connected to the inlet 43 via an inlet pipe 47. The adhesive is emplaced in the intermediate space 31 via the inlet port 45, the inlet pipe 47 and the inlet 43.

The adhesive can be emplaced in the intermediate space 31 in different ways. One variant is to emplace the adhesive 31 by means of vacuum infusion. A negative pressure is applied at the outflow port 44. The air present in the intermediate space 31 is thus largely extracted. Then the adhesive is emplaced in the intermediate space 31 via the inlet port 45. The rest of the air remaining in the intermediate space 31 can be extracted via the outlets 49, 42 until both outlets 49, 42 are blocked with adhesive.

A further variant is to press the adhesive into the intermediate space 31 via the inlet port 45. During pressing in, the air is displaced by the adhesive 31. The air can escape through the two outlets 49, 42. Escape of the air is no longer possible only when both outlets 49, 42 are blocked with adhesive. In this variant, the tool 40 must be fixed on the component 11, since the positive pressure in the intermediate space 31 would otherwise press the tool out of the hole 13.

FIG. 10 represents a section through the component 11 with a hole 13. The component has an end face 12. The hole has a longitudinal axis 15. The hole 13 can be made in the component 11 at any required angle. In FIG. 10, the hole 13 is made vertical to the end face 12.

FIG. 11 represents a design variant 50 of the tool 40. In this variant, the tool 50 consists of two parts. The tool consists of a first part 53 and a second part 52. The first part 53 is located in the area of the rear face 22 of the insert 21. The second part 52 is located in the area of the front face 23 of the insert 21. A first outlet of the tool 40 is located on the first part 53, a second outlet on the second part 52. The part of the tool 53 on the end face side thus comprises an inlet 43 and the first outlet 49. The part of the tool 52 on the component side comprises the second outlet 42. In this variant the insert 21 replaces part of the outflow pipe 46. In this variant, only the first part 53 of the tool 40 is removed from the connection arrangement 10 after bonding of insert 21 to component 11. The second part 52 of the tool 40 remains in the connection arrangement 10. The return of the medium is handled in this design variant by the insert 21.

FIG. 12 represents a design variant of a fully assembled connection arrangement 10. An insert 21 with at least one side face 24 is located in a hole, see FIG. 10/19, of the component 11. The insert 21 is located with its front face 23 first in the component 11. Adhesive 31 connects insert 21 and component 11 to one another. One part of the tool 40 can remain in the hole after bonding, see FIG. 10/19 of the component 11. The insert 21 is connected to the bolt 16 by a bolted connection. The bolt 16 is located in a through-hole in the holder 18. The holder 18 rests on the rear face 22 of the insert 21. A pre-stressing force is applied to the connection 10 via a nut 17. The insert 21 is located with its front face 23 first in a hole 13 of a component 11. A part of the tool 40 used for fitting is located on the front face 23 of the insert 21. The intermediate space 31 between the component 11 and the side face 24 of the insert 21 is filled with cured adhesive. The part of the tool 40 on the rear face 22 of the insert 21 has been removed. A holder 18 rests on the rear face 22 of the insert 21. A through-hole for a threaded bolt 16 is located in the holder 18. The threaded bolt 16 is bolted to the insert 21. A pre-stressing force is applied to the connection 10 via a nut 17.

In the previously described design variants, the outlets block reciprocally during bonding. As soon as adhesive reaches the first outlet 49, for example, the adhesive is passed on through the outflow pipe 46 in the direction of the outflow port 44. As soon as the adhesive has reached the pipe branch 48, the adhesive blocks the second outlet 42. The air remaining in the intermediate space 31 can no longer be displaced.

The following describes design variants that prevent reciprocal blocking of the outlets. These variants contain a flow regulation element 62. The flow regulation element 62 allows air to escape. The flow velocity of the adhesive is slowed by the flow regulation element 62, or its flow is stopped.

FIG. 13 represents a design variant 60 of the tool 40. A flow regulation element 62 is located in the outflow pipe 46. In this variant, the flow regulation element 62 is a membrane. Air can escape through this membrane, adhesive is held back by it. The tool thus contains a membrane 62 through which the medium can escape. The adhesive 31 cannot however penetrate the membrane 62. With this variant, the duct on the outlet 49 is not blocked by adhesive, which is discharged through the second outlet 42. If a membrane 62 is provided at both outlets, this permits fitting of the insert irrespective of the position. Adhesive which is extracted by the outlet 42 on the component side is thus held back by the membrane. The adhesive cannot reach the pipe branch 48. Hence the adhesive cannot block the first outlet 49. If a further membrane is additionally provided between the first outlet 49 and the pipe branch 48, reciprocal blocking of the outlets is ruled out.

FIG. 14 represents a design variant 70 of the tool 40 with flow regulation element 76. In this variant, the flow regulation element 76 is a discharge siphon. The siphon between the first outlet 49 and the pipe branch 48 is located at the level of the second outlet 42. As a result, the adhesive 31 is held back by the pipe branch until the adhesive reaches the second outlet 42. The tool thus contains a discharge siphon 76. If a discharge siphon is provided at both outlets, this permits fitting of the insert irrespective of the position.

FIG. 15 represents a design variant 80 of the tool with flow regulation element 81. In this variant, the flow regulation element 81 is a restrictor. The restrictor reduces the flow velocity of the adhesive. The adhesive reaches the pipe branch 48 after a long timelag. The air remaining in the intermediate space 31 can hence be extracted for considerably longer. To that extent, the tool 80 contains a restrictor 81. The restrictor can inclusively, but not exclusively, be a reduction in the cross-sectional surface inside the duct 46. If a restrictor is provided at both outlets, this permits at least temporary fitting of the insert irrespective of the position.

FIG. 16 represents a design variant 90 of the tool 40 with flow regulation element 91. In this variant, the flow regulation element 91 is an overflow container. The adhesive must first fill the overflow container before it reaches the pipe branch 48. The air remaining in the intermediate space 31 can escape for considerably longer. The tool thus contains an overflow container 91. If an overflow container is provided at both outlets, this permits at least temporary fitting of the insert irrespective of the position.

A further variant of a flow regulation element is for example an air outflow valve. The mechanism of the air outflow valve permits the escape of air, but prevents the flow of adhesive.

FIG. 17 represents the end of the bonding process. The intermediate space 31 between insert 21 and component 11 is almost completely filled with adhesive. In the central area of the hole 13, a blockage 101 has formed. The adhesive splits the remaining intermediate space 31 into two parts 102, 103. Due to the two outlets, however, the air remaining in the intermediate spaces 102, 103 can still escape. The intermediate space 31 can in this way be completely filled with adhesive. As a result, adhesive is emplaced in the area between insert 21 and component 11 through the inlet 49 in the tool 40. At the upper side of the hole 13, the adhesive 31 forms a blockage 101. In this way, two air inclusions 102 and 103 are created. Both air inclusions can still be filled with adhesive, since the air they contain can escape through the two outlets of the tool 40.

FIGS. 18 and 19 represent the possibility of fitting irrespective of the position thanks to the invention. In FIG. 18, the end face 12 of the component 11 is tilted downwards. In this position, the outlet 49 on the end face side is already blocked at the start of the bonding process. The air can however reliably escape through the outlet 42 on the component side until the intermediate space 31 is completely filled with adhesive. The rear outlet opening permits a complete filling of the area between insert 21 and component 11 with adhesive 110.

In FIG. 19, the end face 12 of the component 11 is tilted upwards. In this position, the outlet 42 on the component side is already blocked at the start of the bonding process. The air can however reliably escape through the outlet 49 on the end face side until the intermediate space 31 is completely filled with adhesive. The tool 40 permits completes filling of the area between insert 21 and component 11 with adhesive 120.

FIGS. 18 and 19 show that with the tool 40, fitting irrespective of the position of the connection arrangement 10 is possible. It must be noted that the devices from FIG. 6 to FIG. 9 must be provided in the outlet ducts.

A further design variant of the tool 40 is also used for centring or alignment of the insert 21 in the component 11 in addition to air removal. This allows for example the distance between the insert 21 and the inner wall of the hole 13 to be precisely set. Furthermore, it allows the position between several adjacently arranged inserts 21 to be fixed. This can be used to manufacture a planar connecting flange from a plurality of inserts.

A further design variant of the tool 40 is also used for heating the connection arrangement 10 in addition to air removal. A heating element in the tool 40 heats the connection arrangement 10. This permits defined temperature control of the adhesive during emplacement, faster curing, and tempering of the connection arrangement 10.

REFERENCE NUMERAL LIST

10 Fastening device
11 Component
12 Half of the hole on the end face side
13 Hole of component
14 Cross-sectional surfaces of the hole of the component
15 Longitudinal axis of hole
16 Bolt
17 Nut
18 Holder
21 Insert
22 Rear face of the insert
23 Front face of the insert
24 Side face of the insert
31 Adhesive
40 Tool
41 Decoupling element
42 Air inlet/air outlet
43 Inlet area between insert and component
44 Outflow port of the tool
45 Inlet port of the tool
46 Duct in the tool/outflow pipe
47 Duct in the tool/inlet pipe
48 Pipe branch
49 Air inlet/air outlet
50 Tool
51 Separating layer of the decoupling element
52 Part on component side/second part of the tool
53 Part on end face side/first part of the tool
60 Tool
61 Cracks between two areas of the construction
62 Flow regulation element/membrane
70 Tool
71 Geometrical centre of gravity of the hole
72 Distance of the decoupling element to the longitudinal axis
73 Outer radius of the insert
74 Distance of the side face of the insert from the component
75 Fastening area of the insert
76 Flow regulation element/discharge siphon of the tool
80 Tool
81 Flow regulation element/restrictor of tool
90 Tool 91 Flow regulation element/overflow container of the tool
101 Adhesive blockage
102 Air inclusions
103 Air inclusions
110 Adhesive
120 Adhesive

The invention claimed is:

1. An arrangement for fastening a component by an insert, comprising:
   the component having a fastening side with an end face, at least one hole being defined in the end face, the hole configured to receive the insert;
   the insert being inserted into the hole with a front face first;
   an intermediate space between the insert and an inner wall of the hole being at least partially filled with an adhesive;
   at least one decoupling element for reducing stress peaks being inserted between the insert and the inner wall, the at least one decoupling element having a stiffness less than a stiffness of the cured adhesive;
   wherein the hole in the component has a longitudinal axis, said longitudinal axis passes through a geometrical centre of the hole, and parts of the decoupling element have a distance to the longitudinal axis which is greater than an arithmetical mean outer radius of a front third of the insert so that the decoupling element shields a front side of the insert and deflected forces are introduced into the insert at other points.

2. The arrangement according to claim 1, wherein the stiffness of the decoupling element is at least 20% less than the average stiffness of the cured adhesive, and/or the hole in the component has cross-sectional surfaces aligned vertical to the longitudinal axis of the hole and the surface of the decoupling element is larger than 10% of the average cross-sectional surface of the hole.

3. The arrangement according to claim 1, wherein the lower stiffness of the decoupling element is attained by a material with a modulus of elasticity at least 20% lower than the cured adhesive, and/or the lower stiffness of the decoupling element is attained by an omission in the adhesive, and/or the lower stiffness of the decoupling element is attained by a separating layer with reduced adhesion between two areas of a construction, and/or the lower stiffness of the decoupling element is attained by a provocation of cracks between two areas of the construction.

4. The arrangement according to claim 1, wherein the decoupling element consists of at least one material, and/or the decoupling element is one-part or multi-part, and/or the decoupling element is a hollow element, and/or the decoupling element is a hollow space.

5. The arrangement according to claim 1, wherein the insert has at least one side face having a distance from the component, and the fastening area of the insert is that part which is located in the component, and the arithmetical mean distance between the side face and the component in the front tenth of the fastening area of the insert is greater than 10% of the arithmetical mean radius of the fastening area of the insert.

6. The arrangement according to claim 1, wherein the component is a rotor blade for wind turbines.

7. The arrangement according to claim 1, wherein a tool is inserted in the arrangement in such a way that air inclusion between the insert and the component can be reduced during fitting.

8. A tool for an assembly according to claim 7 having at least two outlets for air to be displaced during insertion of an adhesive, wherein at least one outlet is assignable to an area of a half of a hole on an end face side and at least one outlet is assignable to an area of a half of the hole on a component side, wherein said tool contains at least one flow regulation element, comprising at least one membrane or at least one discharge siphon or at least one restrictor or at least one overflow container or at least one air outflow valve.

9. The tool according to claim 8, wherein the tool centres an insert in the hole, or the tool aligns the insert in the hole, or the tool aligns the insert to the component, or the tool aligns the insert to other inserts.

10. The tool according to claim 8, wherein the tool contains a heating element.

11. The tool according to claim 8, wherein the component is a rotor blade for wind turbines.

12. A method for fastening a component by an insert and with a decoupling element according to claim 1, the method comprising the steps of:
    providing a component with a hole;
    providing an insert;
    providing a decoupling element;
    inserting the insert into the hole of the component;
    inserting the decoupling element between the insert and an inner wall of the hole of the component;
    placing an adhesive between the insert and the inner wall of the hole; and
    curing the adhesive.

13. The method according to claim 12, wherein the component is a rotor blade for wind turbines.

14. The method according to claim 12, further comprising, using a tool in such a way that air inclusion between the insert and the component is reduced during assembly.

15. The method according to claim 14, wherein an intermediate space is created between the insert and an inner wall of the hole, which is filled with the adhesive, wherein air must be displaced for bonding and the displaced air escapes through at least one outlet in an area of a half of the hole on an end face side and through at least one outlet in an area of a half of the hole on a component by means of the tool.

* * * * *